(12) United States Patent
Clemen et al.

(10) Patent No.: US 10,837,646 B2
(45) Date of Patent: Nov. 17, 2020

(54) COMBUSTION CHAMBER SHINGLE ARRANGEMENT OF A GAS TURBINE

(71) Applicant: Rolls-Royce Deutschland Ltd & Co KG, Blankenfelde-Mahlow (DE)

(72) Inventors: Carsten Clemen, Mittenwalde (DE); Michael Ebel, Rangsdorf (DE); Kay Heinze, Ludwigsfelde (DE); Stefan Penz, Werneuchen (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 245 days.

(21) Appl. No.: 15/905,076

(22) Filed: Feb. 26, 2018

(65) Prior Publication Data
US 2018/0252413 A1 Sep. 6, 2018

(30) Foreign Application Priority Data
Mar. 1, 2017 (DE) .......................... 10 2017 203 326

(51) Int. Cl.
*F23R 3/60* (2006.01)
*F23R 3/00* (2006.01)
*F23R 3/10* (2006.01)

(52) U.S. Cl.
CPC ................ *F23R 3/60* (2013.01); *F23R 3/002* (2013.01); *F23R 3/10* (2013.01); *F23R 2900/03041* (2013.01)

(58) Field of Classification Search
CPC .... F23R 3/002; F23R 3/60; F23R 3/10; F23R 2900/03041; F23R 3/007; F23R 3/50; F23R 2900/00017; F23R 5/02; F23R 5/04
See application file for complete search history.

(56) References Cited

U.S. PATENT DOCUMENTS

| 5,000,005 A | 3/1991 | Kwan et al. |
| 7,089,748 B2 * | 8/2006 | Tiemann ................ F23M 5/04 60/757 |

(Continued)

FOREIGN PATENT DOCUMENTS

| DE | 102014222320 A1 | 5/2016 |
| EP | 2730843 A1 | 5/2014 |

(Continued)

OTHER PUBLICATIONS

German Search Report dated Jan. 3, 2017 for counterpart German Application No. DE 10 2017 203 326.6.

(Continued)

*Primary Examiner* — Jason H Duger
(74) *Attorney, Agent, or Firm* — Shuttleworth & Ingersoll, PLC; Timothy J Klima (57) ABSTRACT

A combustion chamber shingle arrangement of a gas turbine, including a combustion chamber shingle, at least one threaded bolt configured for attaching the combustion chamber shingle, and a base body connecting the threaded bolt to the combustion chamber shingle, wherein the base body comprises a platform and a connection area that connects the platform to the combustion chamber shingle, wherein the threaded bolt is arranged at the platform, and wherein a hollow space is embodied between the platform and the combustion chamber shingle.

10 Claims, 7 Drawing Sheets

(56) References Cited

U.S. PATENT DOCUMENTS

| | | |
|---|---|---|
| 9,683,743 B2 | 6/2017 | Clemen |
| 2005/0086945 A1 | 4/2005 | Tiemann |
| 2013/0318979 A1 | 12/2013 | Kramer et al. |
| 2014/0250894 A1* | 9/2014 | Petty, Sr. .................. F23R 3/60 60/754 |
| 2015/0128602 A1 | 5/2015 | Clemen |
| 2015/0260400 A1* | 9/2015 | Clemen .................. F23R 3/002 60/722 |

FOREIGN PATENT DOCUMENTS

| | | |
|---|---|---|
| EP | 2873921 A1 | 5/2015 |
| EP | 2918915 A1 | 9/2015 |

OTHER PUBLICATIONS

European Search Report dated Jun. 29, 2018 for counterpart European Patent Application No. 18159207.2.

* cited by examiner

COMBUSTION CHAMBER SHINGLE ARRANGEMENT OF A GAS TURBINE

This application claims priority to German Patent Application DE102017203326.6 filed Mar. 1, 2017, the entirety of which is incorporated by reference herein.

DESCRIPTION

The present invention relates to a combustion chamber shingle arrangement of a gas turbine, in particular an aircraft gas turbine, with improved thermal behavior.

Combustion chamber shingle arrangements for gas turbines are known from the state of the art in different embodiments. Combustion chamber shingle arrangements are usually attached at a combustion chamber outer wall. For this purpose, in addition to the combustion chamber shingle, the combustion chamber shingle arrangement also comprises an attachment appliance in the form of a threaded bolt. As known from DE 102014222320 A1, such threaded bolts are affixed at the backside of the shingle by means of a welded connection or are provided integrally as a molded structural component. The known combustion chamber shingles further have a high number of effusion cooling holes (often several thousand) that serve for cooling the combustion chamber shingle against the high temperatures inside the combustion chamber of the gas turbine. Also, combustion chamber shingles usually have so-called admixing cooling holes that serve for conducting air from the space that externally surrounds the combustion chamber into the combustion chamber so as to cool off and lean the combustion. At that, the plurality of effusion cooling holes ensures that the temperature at the combustion chamber shingle does not become excessively high. Usually, the combustion chamber shingles are attached at the combustion chamber outer wall by means of nuts at the threaded bolts. Now it has been found that problems with so-called material creeping keep occurring during operation, which may lead to a failure of the threaded bolt. Since the base of the threaded bolt by means of which the threaded bolt is welded to the combustion chamber shingle cannot be cooled, very high temperatures can occur at the threaded bolt, which may result in the above-mentioned problems.

It is therefore the objective of the present invention to provide a combustion chamber shingle arrangement which facilitates an improved cooling of the combustion chamber shingle arrangement and which can in particular prevent material creeping in the area of a threaded bolt, while at the same time being characterized by a simple structure as well as easy and cost-effective manufacturability.

This objective is achieved through a combustion chamber shingle arrangement having features as disclosed herein. The present disclosure also shows further embodiments.

The combustion chamber shingle arrangement as disclosed herein has the advantage that a combustion chamber shingle can also be cooled below the area of a threaded bolt. In this way, the creeping of the threaded bolt and thus a possible detachment of the combustion chamber shingle arrangement from a combustion chamber outer wall or the like is avoided. According to the invention, this is achieved by the combustion chamber shingle arrangement comprising a combustion chamber shingle as well as at least one threaded bolt. The threaded bolt is configured for attaching the combustion chamber shingle. The attachment is preferably realized by means of a nut. Further, the combustion chamber shingle arrangement comprises a base body that connects the threaded bolt to the combustion chamber shingle. The base body comprises a platform at which the bolt is arranged and a connection area that connects the platform to the combustion chamber shingle, with a hollow space being embodied between the platform and the combustion chamber shingle. The bolt is arranged at the platform of the base body, wherein the hollow space between the platform and the combustion chamber shingle ensures that the temperatures directly at the base of the threaded bolt will not become too high.

Preferably, the combustion chamber shingle comprises a plurality of effusion cooling holes, with at least one effusion cooling hole, preferably a plurality of effusion cooling holes, being provided in an area of the combustion chamber shingle below the base body. Further, the hollow space between the base body and the combustion chamber shingle is connected to a rear environment of the combustion chamber shingle by means of at least one passage hole, preferably a plurality of passage holes. What is achieved as a result is a cooling flow below the platform through the passage hole in the connection area to the at least one effusion cooling hole below the base body. As a result, an even better cooling of the combustion chamber shingle is facilitated. In particular, an entire surface of the combustion chamber shingle, including the areas at which the threaded bolt are arranged, can be cooled. Thus, a homogenous temperature distribution is achieved at the combustion chamber shingle, whereby a service life of the combustion chamber shingle arrangement is significantly prolonged.

It is particularly preferred if a cross section of the at least one passage hole in the base body for connecting to the hollow space is larger or equal to a sum of all cross sections of the effusion cooling holes in the area below the base body. Thus, it is ensured that the cooling air flow below the base body is not slowed down.

It is further preferred if the combustion chamber shingle, the base body and the threaded bolt are made in one piece from the same material. Consequently, no welded connections need to be provided between the structural components, and consequently no structural changes or the like can occur, which may possibly be disadvantageous with respect to the durability of the combustion chamber shingle arrangement. Here, it is particularly preferable if the combustion chamber shingle arrangement is a structural component that is manufactured in an additive manner.

According to a further preferred embodiment of the present invention, the combustion chamber shingle has a shingle edge, in particular a closed circumferential shingle edge at a combustion chamber backside, i.e. the side that is facing away from the combustion chamber. Beginning at the backside of the combustion chamber shingle, the shingle edge preferably has a larger height than a maximum height of the base body from a backside of the combustion chamber shingle. Here, the lesser height of the base body facilitates a sealing abutment between the circumferential shingle edge and the combustion chamber outer wall.

Alternatively, the shingle edge has the same height as a height of the base body from the backside of the combustion chamber shingle. If the shingle edge and the base body have the same height, it is possible that, in the mounted state, the base body also comes into contact with the attachment component, in particular a combustion chamber outer wall. In this manner, a decoupling of the screw connections by means of the threaded bolt from the connection area of the connections of the platform to the combustion chamber shingle can be achieved.

It is further preferred if the threaded bolt has a passage hole that extends all the way to the hollow space. The passage hole is preferably provided in the axial direction of the threaded bolt, preferably abutting the same centrally. In this manner, cooling air can also be supplied into the hollow space below the platform through the threaded bolt.

It is particularly preferable if the hollow space is accessible from multiple sides. As a result, a cooling from all connection areas of the base body is facilitated. A particularly good cooling of the threaded bolt is facilitated if a contact surface of the bolt at the platform is smaller that a total surface of the platform. Preferably, the total surface of the platform is at least twice the size of the contact surface of the threaded bolt, wherein the size of the contact surface preferably results from the cylindrical round body of the bolt.

It is to be understood that the platform can have any geometrical shape, such as for example a rectangle, a square, a circle, an oval, or a triangle.

A particularly effective cooling is achieved if cooling openings are additionally provided in the connection area between the platform and the combustion chamber shingle. That is, the connection area that establishes the connection between the backside of the combustion chamber shingle and the platform also has cooling openings. Here, a larger cooling opening or a plurality of very small cooling openings may be provided.

The shape of the base body is preferably similar to a bridge, i.e. having two pillars that can be connected to each other through the platform, with the pillars preferably having the same width as the platform.

Further, the present invention relates to a gas turbine, in particular an aircraft gas turbine, comprising at least one combustion chamber shingle arrangement according to the invention.

In the following, preferred exemplary embodiments of the invention are described in detail by referring to the accompanying drawing. In the drawing, identical or functionally identical parts are indicated by the same reference signs. Herein.

Figure 1:
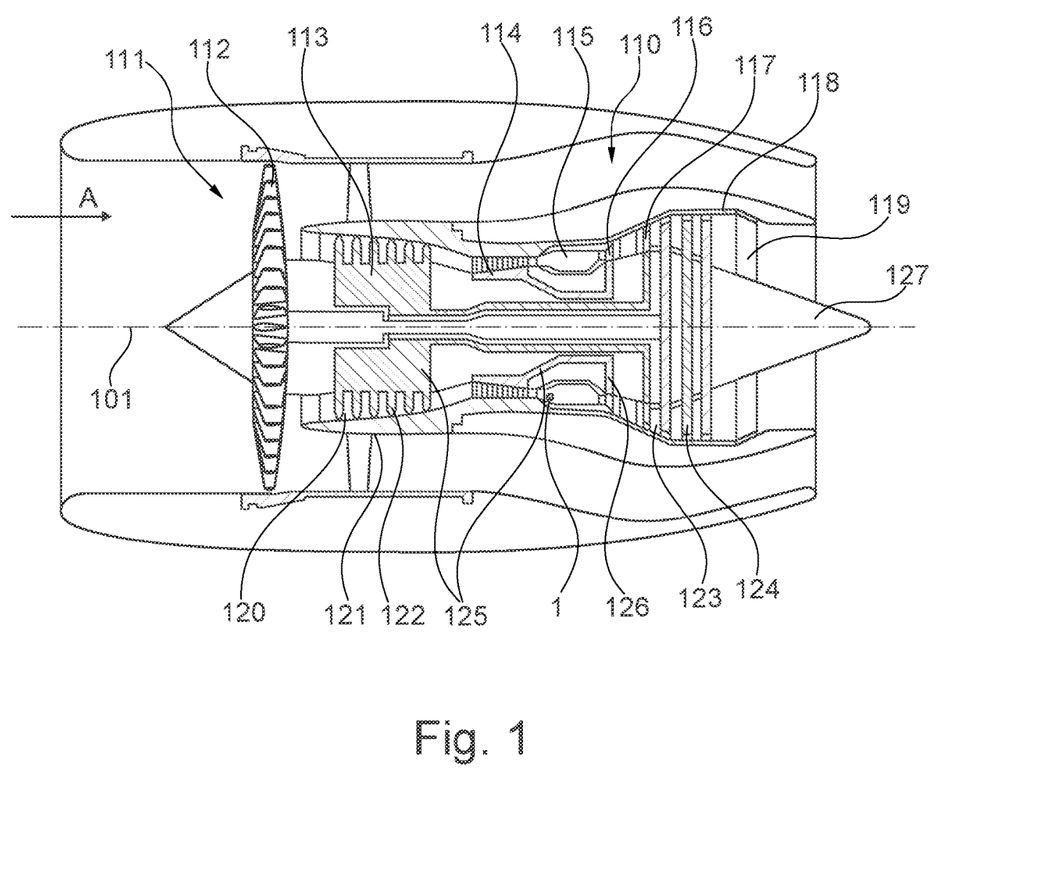
FIG. 1 shows a gas turbine engine with a combustion chamber shingle arrangement according to the invention.

The gas turbine engine 110 according to FIG. 1 represents a general example of a turbomachine in which the invention may be used. The gas turbine engine 110 is configured in a conventional manner and comprises, arranged successively in flow direction, an air intake 111, a fan 112 that rotates inside a housing, a medium-pressure compressor 113, a high-pressure compressor 114, a combustion chamber 115, a high-pressure turbine 116, a medium-pressure turbine 117, and a low-pressure turbine 118 as well as an exhaust nozzle 119, which are all arranged around a central engine axis 101.

The medium-pressure compressor 113 and the high-pressure compressor 114 respectively comprise multiple stages, of which each has an arrangement of fixedly arranged stationary guide vanes 120 that extends in the circumferential direction, with the stationary guide vanes 120 being generally referred to as stator vanes and projecting radially inward from the core engine housing 121 through the compressors 113, 114 into a ring-shaped flow channel. Further, the compressors have an arrangement of compressor rotor blades 122 that project radially outward from a rotatable drum or disc 125, and are coupled to hubs 126 of the high-pressure turbine 116 or the medium-pressure turbine 117.

The turbine sections 116, 117, 118 have similar stages, comprising an arrangement of stationary guide vanes 123 projecting radially inward from the housing 121 through the turbines 116, 117, 118 into the ring-shaped flow channel, and a subsequent arrangement of turbine blades/vanes 124 projecting outwards from the rotatable hub 126. During operation, the compressor drum or compressor disc 125 and the blades 122 arranged thereon as well as the turbine rotor hub 126 and the turbine rotor blades/vanes 124 arranged thereon rotate around the engine central axis 101. The gas turbine engine is not necessarily a three-shaft construction, but preferably is a double-shaft engine.

Figure 2:
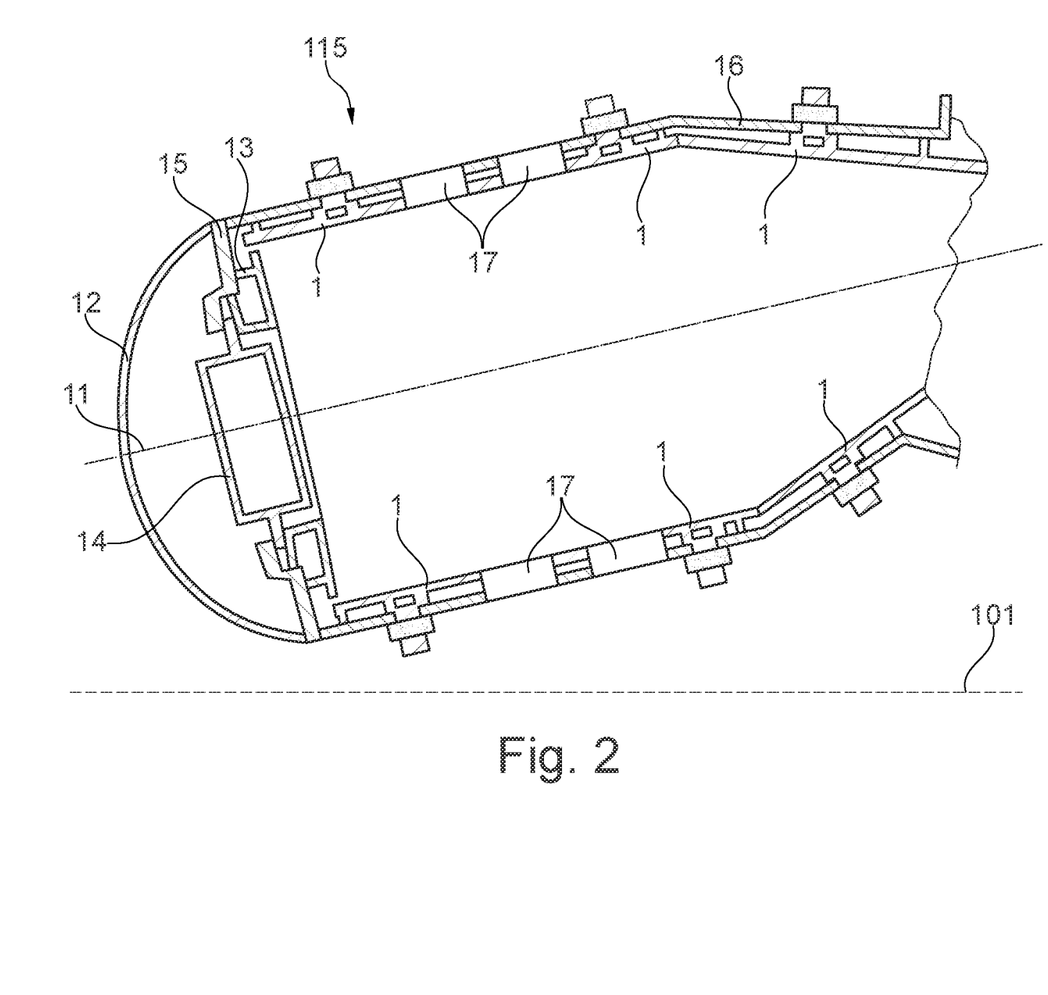
FIG. 2 shows a schematic sectional view of a combustion chamber of a gas turbine of FIG. 1 according to a first exemplary embodiment of the invention.
Figure 3:
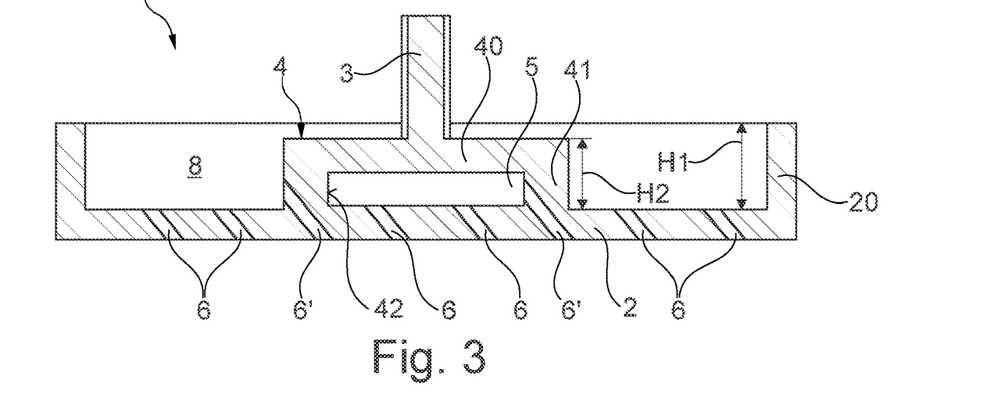
FIG. 3 shows a schematic enlarged rendering of a combustion chamber shingle arrangement of FIG. 2 in the non-mounted state.
Figure 4:
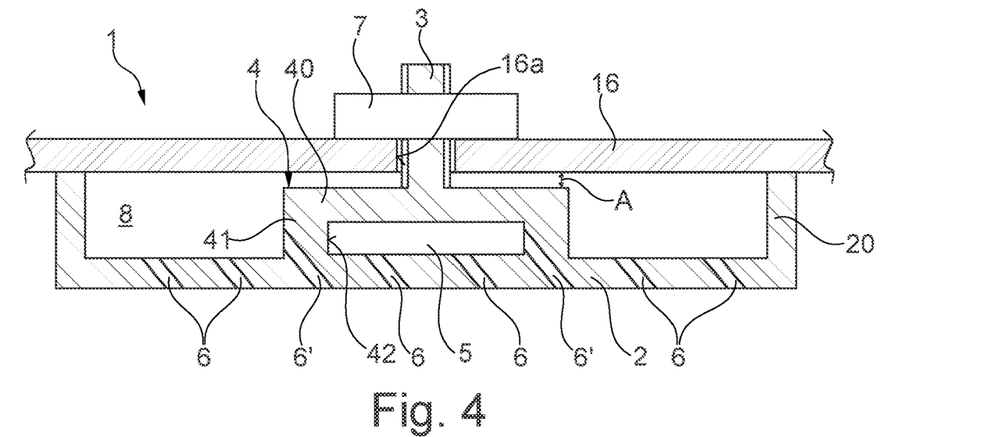
FIG. 4 shows a schematic enlarged rendering of a combustion chamber shingle arrangement of FIG. 2 in the mounted state.

FIGS. 2 to 4 show a detailed rendering of a combustion chamber shingle arrangement 1 and a combustion chamber 115 with such a combustion chamber shingle arrangement.

FIG. 2 shows a longitudinal section through the combustion chamber. At that, a combustion chamber 115 with a central axis 101 is shown, comprising a combustion chamber head 12 and a heat shield 13, and the associated burner axis 11. A burner seal 14 is provided at the heat shield 13. The burner seal 14 is arranged at a base plate 15. A burner which is sealed at the burner seal and via which fuel is conducted into the combustion chamber 115 is not shown.

The combustion chamber further comprises an outer cold combustion chamber wall 16. A plurality of combustion chamber shingle arrangements 1 is arranged at the interior of the outer cold combustion chamber wall 16. These combustion chamber shingle arrangements 1 are shown in a schematic manner in FIG. 2 and can be seen in detail in FIGS. 3 and 4.

Further, only multiple admixing cooling holes 17 are provided for supplying air into the interior of the combustion chamber 115.

As can be seen in FIG. 3, each combustion chamber shingle arrangement 1 comprises a combustion chamber shingle 2, a threaded bolt 3, and a base body 4. The base body 4 connects the threaded bolt 3 to the combustion chamber shingle 2.

As can be seen in FIG. 3, in this exemplary embodiment the combustion chamber shingle 2, the threaded bolt 3, and the base body 4 are made in one piece from the same material.

A plurality of effusion cooling holes 6 is provided in the combustion chamber shingle 2 to cool the combustion chamber shingle 2 directly bordering the combustion space 115.

As can further be seen in FIG. 3, a hollow space 5 is provided between the base body 4 and the combustion chamber shingle 2. The base body 4 comprises a platform 40 and a connection area 41. The platform 40 is a flat surface on which the threaded bolt 3 is arranged. The threaded bolt 3 is preferably arranged centrally on the platform 40.

The hollow space 5 is connected to the rear environment 8 of the combustion chamber shingle 2 via two passage holes 42, which are arranged perpendicular to the drawing plane of FIG. 3. In this way, cooling air can flow from the rear environment 8 via the passage hole 42 into the hollow space 5, and from there into the effusion cooling holes 6 that are arranged below the base body 4.

Here, a cross section of the passage holes 42 is considerably larger then a sum of all cross sections of the effusion cooling holes 6 below the base body 4. As a result, the cooling air is prevented from slowing down up to the inlet cross section of the effusion cooling holes 6.

Thus, the base body 4 substantially has the shape of a bridge that spans a partial area of the backside of the combustion chamber shingle 2.

As can further be seen in FIG. 3, two effusion cooling holes 6' are also partially formed in the connection area 41 of the base body 4. As a result, thermal conduction from the combustion chamber shingle 2 via the connection area 41 into the base body is prevented, or at least reduced.

The combustion chamber shingle 2 further has a circumferentially provided shingle edge 20. The shingle edge 20 protrudes from a backside of the combustion chamber shingle 2 with a first height H1. As can further be seen from FIG. 3, a second height H2 of the base body 4 is smaller than the first height H1. Thus, the platform 40 does not come into direct contact with the outer combustion chamber wall 16, as shown in FIG. 4 in the mounted state. Thus, a distance A is present between the platform 40 and the inner side of the outer combustion chamber wall 16. As a result, the platform 40 can also be cooled on its top by a surround-flow of cooling air. In particular, the threaded bolt 3 can also be cooled in this way, so that the occurrence of an excessively high temperature increase at the threaded bolt 3 can be avoided, whereby a creeping of the material of the threaded bolt 3 is prevented.

The distance A further facilitates that the shingle edge 20 abuts the inner side of the combustion chamber wall 16 in a sealing manner.

The threaded bolt 3 is passed through an opening 16a in the outer combustion chamber wall 16.

As shown in FIG. 4, the threaded bolt 3 is screwed on by means of a nut 7 at the outer combustion chamber wall 16. Thanks to the hollow space 5, it is further possible that the entire surface of the combustion chamber shingle 2 is provided with effusion cooling holes 6, and an optimal cooling of the combustion chamber shingle 2 is thus facilitated. So far, the areas at which the threaded bolts 4 represented an integral component of the shingle 2 or at which they were welded on could not be cooled in the state of the art. Thus, an uneven temperature distribution at the combustion chamber shingle 2 can also be prevented, whereby a measuring accuracy of the combustion chamber shingle arrangement is further improved.

In this manner, in particular a service life of the combustion chamber shingle arrangement can be significantly improved. Since in this exemplary embodiment the combustion chamber shingle arrangement is a one-piece structural component made of the same material, an additive manufacturing method is preferably provided for manufacturing the combustion chamber shingle arrangement. Consequently, additional components can be avoided, which facilitates further cost reduction and in particular also a simpler mounting.

Figure 5:
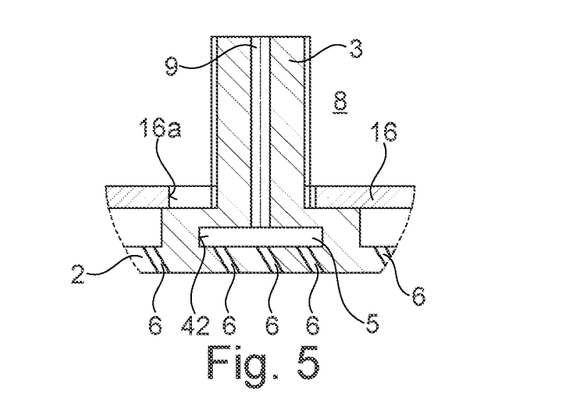
FIG. 5 shows a schematic enlarged partial section view of a combustion chamber shingle arrangement according to a second exemplary embodiment of the invention.

FIG. 5 shows a combustion chamber shingle arrangement according to a second exemplary embodiment of the invention in a schematic manner. In FIG. 5, only the base body 4 with the threaded bolt 3 and the hollow space 5 is shown in detail.

In the second exemplary embodiment, a plurality of effusion cooling holes 6 is again provided below the base body 4, with small effusion cooling holes 6 being provided in the connection area 41 between the platform 40 and the combustion chamber shingle 2. In contrast to the first exemplary embodiment, in the second exemplary embodiment the platform 40 touches the inner side of the combustion chamber wall 16. Further, the bolt 3 has a passage hole 9 that extends all the way to the hollow space 5. The result is an additional possibility for cooling the threaded bolt 3. At that, the passage hole 9 is arranged centrally inside the threaded bolt 3. Further, thanks to the direct contact between the platform 40 and the inner side of the combustion chamber wall 16, a thermal conduction from the platform 40 to the cooler combustion chamber wall 16 can also be achieved, so that an even better cooling of the platform 40 and thus of the base body 4 is facilitated.

Figure 6:
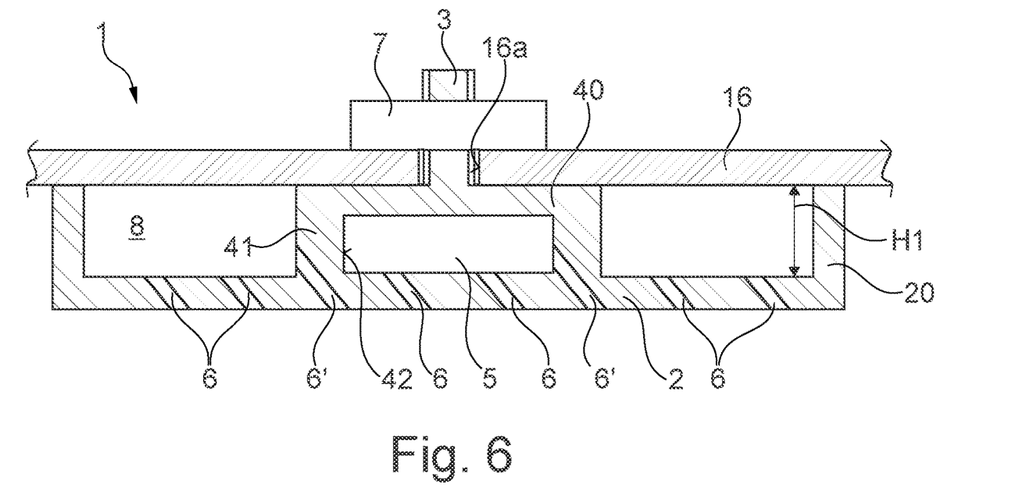
FIG. 6 shows a schematic sectional view of a combustion chamber shingle arrangement according to a third exemplary embodiment of the invention.

FIG. 6 shows a combustion chamber shingle arrangement 1 according to a third exemplary embodiment of the invention. The third exemplary embodiment substantially corresponds to the first exemplary embodiment, wherein, in contrast to the first exemplary embodiment, the platform 40 touches the inner side of the outer combustion chamber wall 16. In this way, a heat transfer by means of thermal conduction from the platform 40 to the combustion chamber wall 16 is facilitated. Further, the preload force that is created by the nut-bolt connection can be received inside the bridge, and does not act directly on the connection areas 41, which many have a higher temperature due to functional reasons. A first height H1 of the shingle edge 20 starting at the backside of the combustion chamber shingle is identical to the height of the platform 40. As a result, the platform 40 can touch the inner side of the combustion chamber wall 16 in the mounted state.

Figure 7:
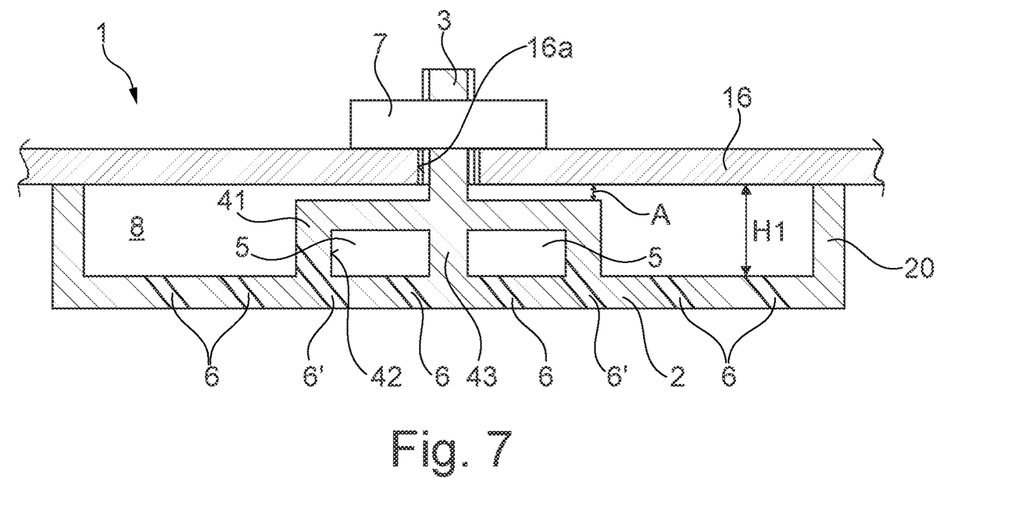
FIG. 7 shows a schematic sectional view of a combustion chamber shingle arrangement according to a fourth exemplary embodiment of the invention.

FIG. 7 shows a combustion chamber shingle arrangement 1 according to a fourth exemplary embodiment of the invention. The fourth exemplary embodiment substantially corresponds to the first exemplary embodiment, wherein the base body 4 additionally comprises a central support 43. The central support 43 in particular increases the stability below the threaded bolt 3.

Figure 8:
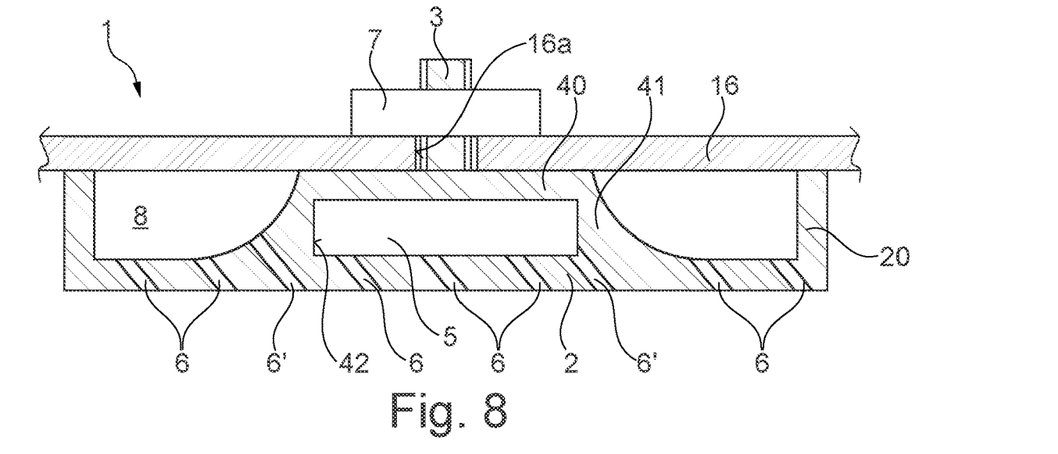
FIG. 8 shows a schematic sectional view of a combustion chamber shingle arrangement according to a fifth exemplary embodiment of the invention.

FIG. 8 shows a combustion chamber shingle arrangement 1 according to a fifth exemplary embodiment of the invention. The fifth exemplary embodiment substantially corresponds to the third exemplary embodiment, wherein the connection area 41 of the fifth exemplary embodiment is embodied with tangential transitions, in a manner that is advantageous with respect to the structural strength.

Figure 9:
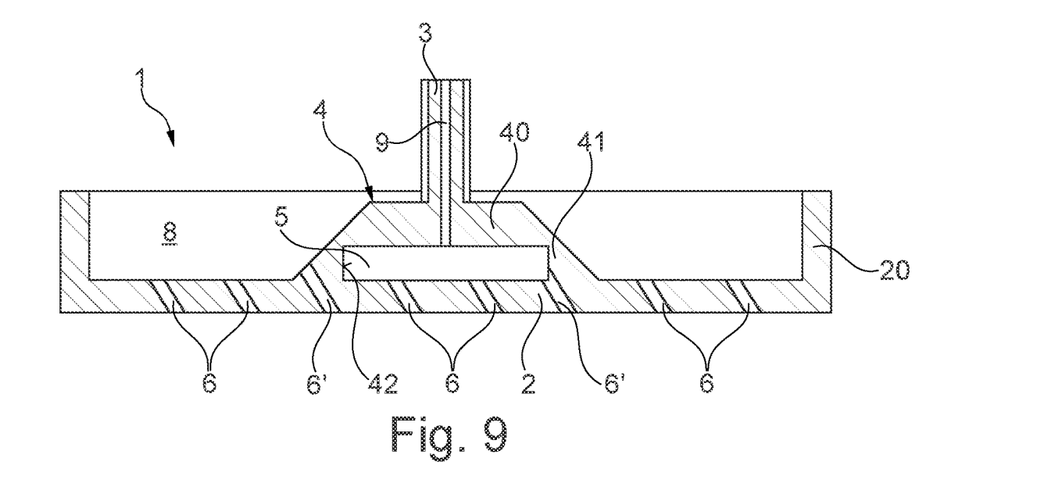
FIG. 9 shows a schematic sectional view of a combustion chamber shingle arrangement according to a sixth exemplary embodiment of the invention.

FIG. 9 shows a further embodiment of the invention according to a sixth exemplary embodiment. In the sixth exemplary embodiment, the connection area 41 is embodied in a tapering manner. Further, a central passage hole 9 is arranged inside the threaded bolt 3, as in the exemplary embodiment of FIG. 5.

Figure 10:
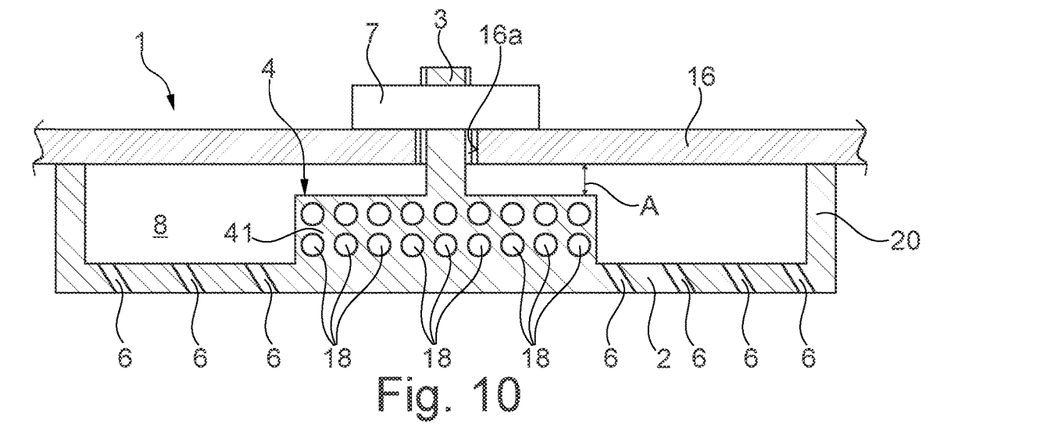
FIG. 10 shows a schematic sectional view of a combustion chamber shingle arrangement according to a seventh exemplary embodiment of the invention.
Figure 11:
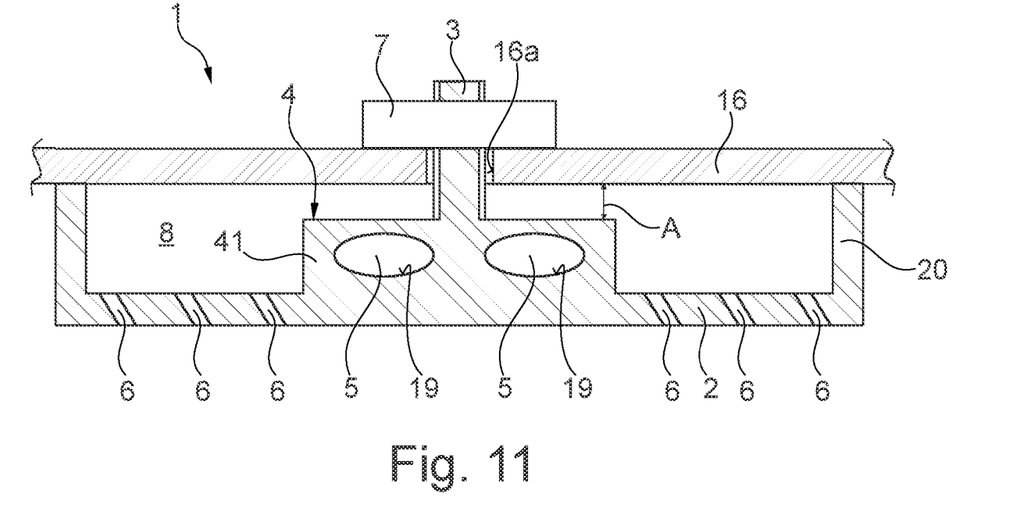
FIG. 11 shows a schematic sectional view of a combustion chamber shingle arrangement according to an eighth exemplary embodiment of the invention.

FIGS. 10 and 11 show further preferred embodiments of the invention, wherein in the seventh exemplary embodiment of FIG. 10 a plurality of small air openings 18 is provided, which are embodied in the connection area 41 and extend all the way to the hollow space 5. In the eighth exemplary embodiment of FIG. 11, only two larger oval openings 19 are provided.

Figure 12:
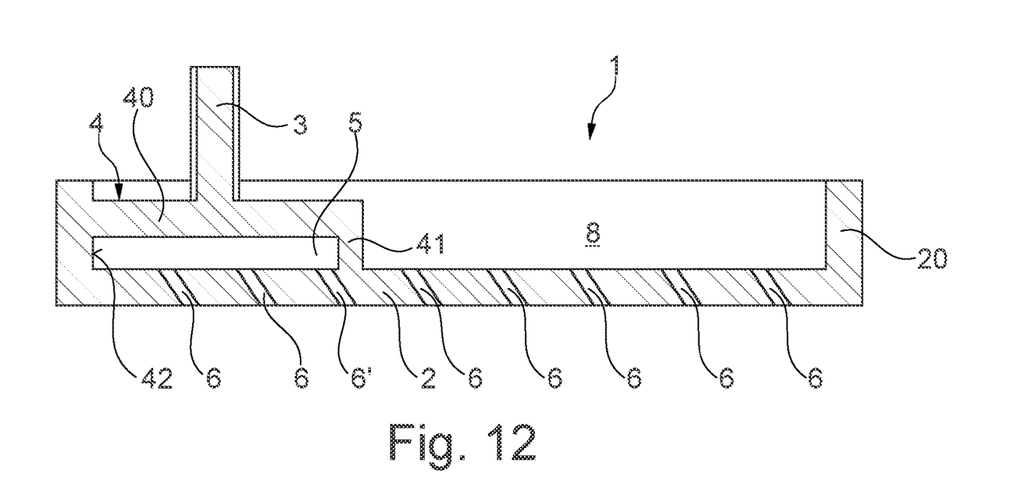
FIG. 12 shows a schematic sectional view of a combustion chamber shingle arrangement according to a ninth exemplary embodiment of the invention.

FIG. 12 shows a combustion chamber shingle arrangement according to a ninth exemplary embodiment of the invention. In contrast to the previous exemplary embodiments in which the base body 4 and the threaded bolt 3 were arranged substantially centrally at the combustion chamber shingle 2, in the ninth exemplary embodiment the base body 4 and the threaded bolt 3 are arranged at an edge of the combustion chamber shingle, directly adjacent to the shingle edge 20. It is to be understood that the outer surface of the base body 4 can preferably also be flush with the shingle edge 20.

Figure 13:
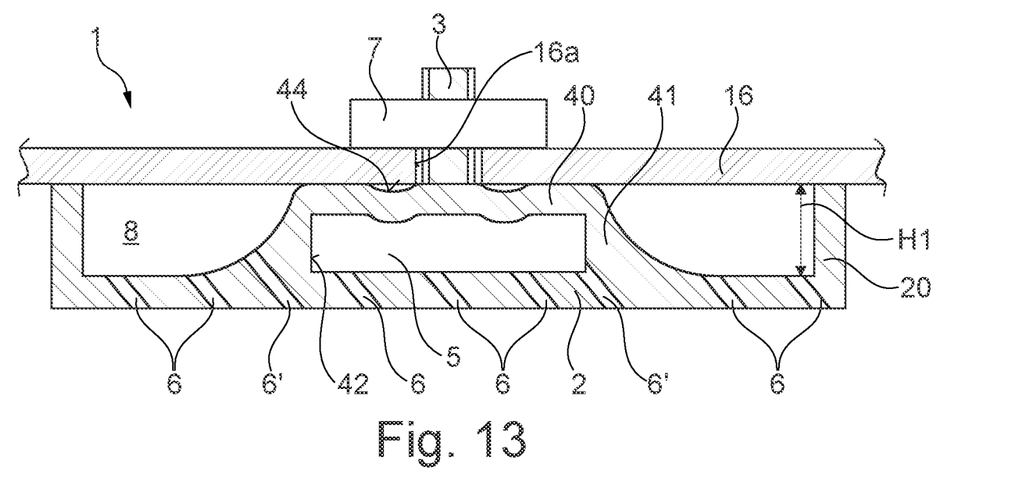
FIG. 13 shows a schematic sectional view of a combustion chamber shingle arrangement according to a tenth exemplary embodiment of the invention.

FIG. 13 shows a combustion chamber shingle arrangement according to a tenth exemplary embodiment of the invention. The tenth exemplary embodiment substantially corresponds to the fifth exemplary embodiment shown in FIG. 8, wherein the platform has an indentation 44 that completely surrounds the threaded bolt 3 circumferentially. As shown in FIG. 13, a height of the platform 40 is equal to a height H1 of the shingle edge 20. Thus, in the mounted state, the outer combustion chamber wall 16 rests on the platform 40. Due to the indentation 44, an improved stiffness of the platform 40 can be achieved. Further, an improved absorption of the preload force of the nut-bolt connection is possible through the contact between partial areas of the platform 40 and the combustion chamber wall 16. Here, a transition of the indentation 44 to the neighboring surfaces at the platform 40 can be realized in an edge-free manner. Thus, the platform 40 is not embodied as a flat surface, but rather has the indentation 44 that extends around the threaded bolt 3, whereby it is in particular also possible that a base of the threaded bolt 3 transitions into the indentation 44 with a predefined radius, as a result of which the threaded bolt 3 becomes more stable.

Figure 14:
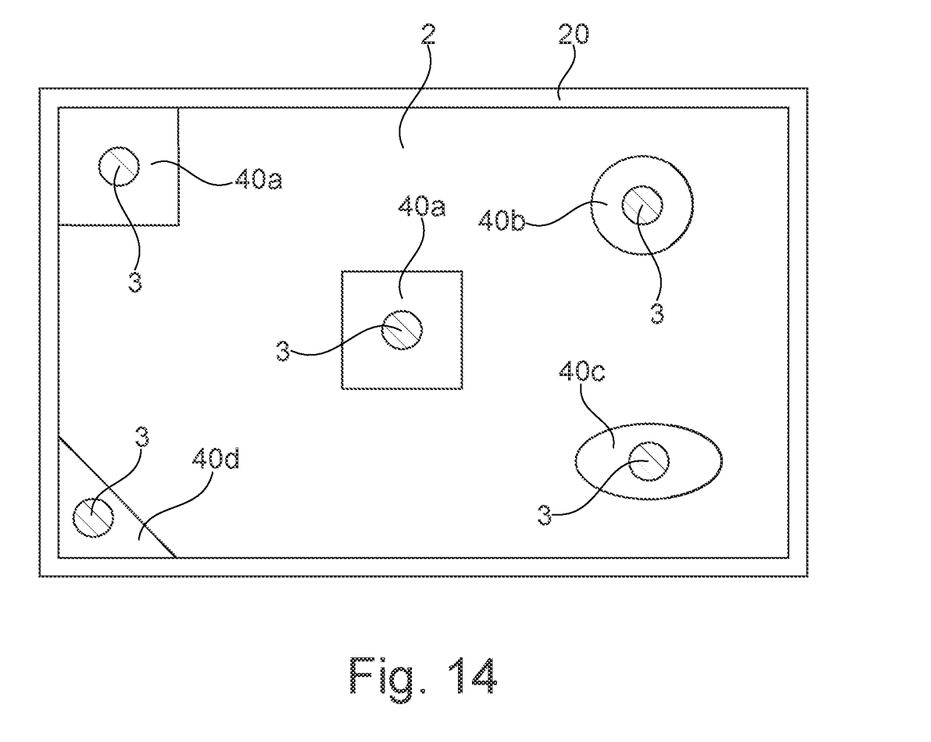
FIG. 14 shows a schematic top view of a backside of a combustion chamber shingle arrangement with different geometrical embodiments and arrangement positions on the combustion chamber shingle.

FIG. 14 once more shows detailed renderings of different geometrical embodiments of the base body 4 as well as of the arrangement position at the backside of the combustion chamber shingle 2. The base body 4 can have an angular platform 40a, or a round platform 40b, or an oval platform 40c, or a triangular platform 40d. The base body 4 can be arranged at the edges of the combustion chamber shingle 2 and can be in direct contact with the shingle edge 20, or can be arranged centrally or at any desired position, such as for example the two base bodies 40b and 40c.

Regarding all described exemplary embodiments it is pointed out that an inflow cross section to the hollow space 5 should always be equal to or larger than a sum of all effusion cooling holes 6 that are arranged below the base body 4. As a result, it is prevented that the flow is slowed down at the effusion cooling holes 6 below the base body 4.

The passage holes 4 establishing the connection from the rear environment 8 of the combustion chamber shingle 2 to the hollow space 5 can have any desired geometrical shape. Only one large opening can be provided, or it is possible to provide multiple medium-sized or small openings.

Thus, according to the invention, an uncooled area below the threaded bolt 3 which is necessary for attaching the combustion chamber shingle 2 can be avoided. For additional cooling, cooling openings can also be provided at the connection areas 41, and/or the platform 40 can be brought into contact with the surrounding combustion chamber wall 16 or can be surrounded by the flow. The connection areas 41 can also be formed integrally with the shingle edge 20.

A surface of the platform 40 is further preferably at least double the size of a diameter of the threaded bolt 3. As a result, a heat flow towards the stress-sensitive threaded bolt 3 can be minimized, and at the same time a minimum flexibility of the suspension can also be ensured, since the platform 40 can be slightly deformed during the affixing process, where necessary.

Also, the connection area 41 preferably has a total cross-sectional surface that is at least as large as the diameter of the threaded bolt 3.

PARTS LIST 1 combustion chamber shingle arrangement
2 combustion chamber shingle
3 threaded bolt
4 base body
5 hollow space
6 effusion cooling holes
6' effusion cooling hole in the connection area
7 nut
8 rear environment of the combustion chamber shingles
9 passage hole inside the threaded bolt
11 burner axis
12 combustion chamber head
13 heat shield
14 burner seal
15 base plate
16 outer combustion chamber wall
16a opening in the outer combustion chamber wall
17 admixing cooling holes
18 smaller air openings
19 larger cooling opening in the connection area
20 shingle edge
40 platform
40a angular platform
40b round platform
40c oval platform
40d triangular platform
41 connection area
42 passage holes
43 central support
44 indentation
101 engine central axis
110 gas turbine engine/core engine
111 air intake
112 fan
113 medium-pressure compressor (compactor)
114 high-pressure compressor
115 combustion chamber
116 high-pressure turbine
117 medium-pressure turbine
118 low-pressure turbine
119 exhaust nozzle 120 guide vanes
121 core engine housing
122 compressor rotor blades
123 guide vanes
124 turbine blades/vanes
125 compressor drum or compressor disc
126 turbine rotor hub
127 outlet cone
A distance
H1 first height
H2 second height

The invention claimed is:

1. A combustion chamber shingle arrangement of a gas turbine, comprising:
    a combustion chamber shingle,
    a threaded bolt, suitable for attaching the combustion chamber shingle, and
    a base body connecting the threaded bolt to the combustion chamber shingle,
    wherein the base body comprises a platform and a connection area that connects the platform to the combustion chamber shingle,
    wherein the threaded bolt is fixedly connected to the platform, with the platform completely surrounding the threaded bolt,
    wherein a hollow space is positioned between the platform and the combustion chamber shingle,
    a combustion chamber wall to which the threaded bolt is connected,
    wherein the platform includes a mounting surface facing the combustion chamber wall, the mounting surface including a portion directly engaging the combustion chamber wall,
    wherein the mounting surface includes an indentation directed away from the combustion chamber wall and positioned between the threaded bolt and an outer periphery of the mounting surface, the indentation extending around the threaded bolt, the mounting surface being spaced away from the combustion chamber wall at the indentation.

2. The combustion chamber shingle arrangement according to claim 1, and further comprising a plurality of effusion cooling holes, wherein at least one of the plurality of effusion cooling holes is arranged in an area of the combustion chamber shingle below the base body, wherein the hollow space is connected to an environment of the combustion chamber shingle by at least one passage hole.

3. The combustion chamber shingle arrangement according to claim 2, wherein a sum of all cross-sectional areas of the at least one passage hole is larger than or equal to a sum of all cross-sectional areas of the plurality of effusion cooling holes in the area of the combustion chamber shingle below the base body.

4. The combustion chamber shingle arrangement according to claim 1, wherein the combustion chamber shingle, the base body and the threaded bolt are configured in one piece from a same material.

5. The combustion chamber shingle arrangement according to claim 4, wherein the combustion chamber shingle arrangement is a structural component that has been manufactured in an additive manner.

6. The combustion chamber shingle arrangement according to claim 1, wherein, starting from a backside of the combustion chamber shingle, the combustion chamber shingle has a shingle edge that has a first height which is larger than a maximum height of the base body from the backside of the combustion chamber shingle, or wherein, starting from the backside of the combustion chamber shingle, the shingle edge has a same height as the base body.

7. The combustion chamber shingle arrangement according to claim 1, wherein the threaded bolt has a passage hole that extends to the hollow space.

8. The combustion chamber shingle arrangement according to claim 1, wherein the hollow space is connected to an environment from multiple sides.

9. The combustion chamber shingle arrangement according to claim 1, wherein a total surface length of the platform of the base body is at least twice a diameter of the threaded bolt.

10. The combustion chamber shingle arrangement according to claim 1, and further comprising effusion cooling holes that are at least partially embodied in the connection area of the base body.

* * * * *